(12) United States Patent
Gamache

(10) Patent No.: US 10,761,059 B2
(45) Date of Patent: Sep. 1, 2020

(54) DISCHARGE-BASED PHOTO IONISATION DETECTOR FOR USE WITH A GAS CHROMATOGRAPHY SYSTEM

(71) Applicant: Mecanique Analytique Inc., Thetford-Mines (CA)

(72) Inventor: Yves Gamache, Thetford-Mines (CA)

(73) Assignee: MECANIQUE ANALYTIQUE INC., Thetford Mines (Quebec) (CA)

( * ) Notice: Subject to any disclaimer, the term of this patent is extended or adjusted under 35 U.S.C. 154(b) by 292 days.

(21) Appl. No.: 15/555,610

(22) PCT Filed: Mar. 7, 2016

(86) PCT No.: PCT/CA2016/050242
§ 371 (c)(1),
(2) Date: Sep. 5, 2017

(87) PCT Pub. No.: WO2016/141470
PCT Pub. Date: Sep. 15, 2016

(65) Prior Publication Data
US 2018/0038832 A1 Feb. 8, 2018

Related U.S. Application Data

(60) Provisional application No. 62/129,578, filed on Mar. 6, 2015.

(51) Int. Cl.
*G01N 27/66* (2006.01)
*G01N 30/64* (2006.01)
*G01N 30/02* (2006.01)

(52) U.S. Cl.
CPC ............ *G01N 27/66* (2013.01); *G01N 30/64* (2013.01); *G01N 2030/025* (2013.01); *G01N 2030/642* (2013.01)

(58) Field of Classification Search
CPC .. G01N 27/66; G01N 30/64; G01N 2030/025; G01N 2030/642
See application file for complete search history.

(56) References Cited

U.S. PATENT DOCUMENTS

| 5,570,179 | A | * | 10/1996 | Weckstrom | G01N 21/69 356/311 |
| 6,333,632 | B1 | * | 12/2001 | Yang | G01N 27/70 324/459 |

(Continued)

FOREIGN PATENT DOCUMENTS

| EP | 1279955 A1 | 1/2003 |
| WO | 2016/051357 A1 | 4/2016 |

OTHER PUBLICATIONS

European Search Report, EP Application No. 16760967.6, 14 pages, dated Oct. 25, 2018.

(Continued)

*Primary Examiner* — Randy W Gibson
*Assistant Examiner* — Gedeon M Kidanu
(74) *Attorney, Agent, or Firm* — Eversheds Sutherland (US) LLP

(57) ABSTRACT

A discharge-based photo ionisation detector (PID) for use with gas chromatography systems is provided. The PID includes a discharge zone in which a plasma can be generated, resulting in the emission of energetic photons. The PID further includes an ionisation zone in which the gas sample to be analysed is bombarded by the photons created in the discharge zone, photo ionising the impurities in the gas sample. The generated current is measured in order to measure the concentration of impurities in the gas sample. Plasma localizing of the plasma in the discharge zone and optical monitoring of the emission from the plasma in the discharge zone may be provided. Methods using such a PID (Continued)

with a split input from a chromatography column or with inputs from two different chromatography columns are provided.

44 Claims, 7 Drawing Sheets

(56) References Cited

U.S. PATENT DOCUMENTS

| | | | |
|---|---|---|---|
| 7,100,421 B1* | 9/2006 | Herring | G01N 30/64 324/464 |
| 2006/0043279 A1* | 3/2006 | Kudryavtsev | G01N 27/66 250/282 |
| 2006/0290925 A1* | 12/2006 | Nomine | H01J 37/32935 356/316 |
| 2009/0196801 A1* | 8/2009 | Mills | C01B 32/25 422/186 |
| 2014/0145724 A1* | 5/2014 | Shinada | G01N 27/70 324/464 |

OTHER PUBLICATIONS

International Search Report and Written Opinion for International Application No. PCT/CA2016/050242, dated May 26, 2016.
Pulsed Discharge Detector Models D-2 and D-2-I Instruction Manual. Valco Instruments Co. Inc. Obtained from https://www.vici.com/support/manuals/d2.pdf. Obtained on Aug. 30, 2017. Published 2003.

* cited by examiner

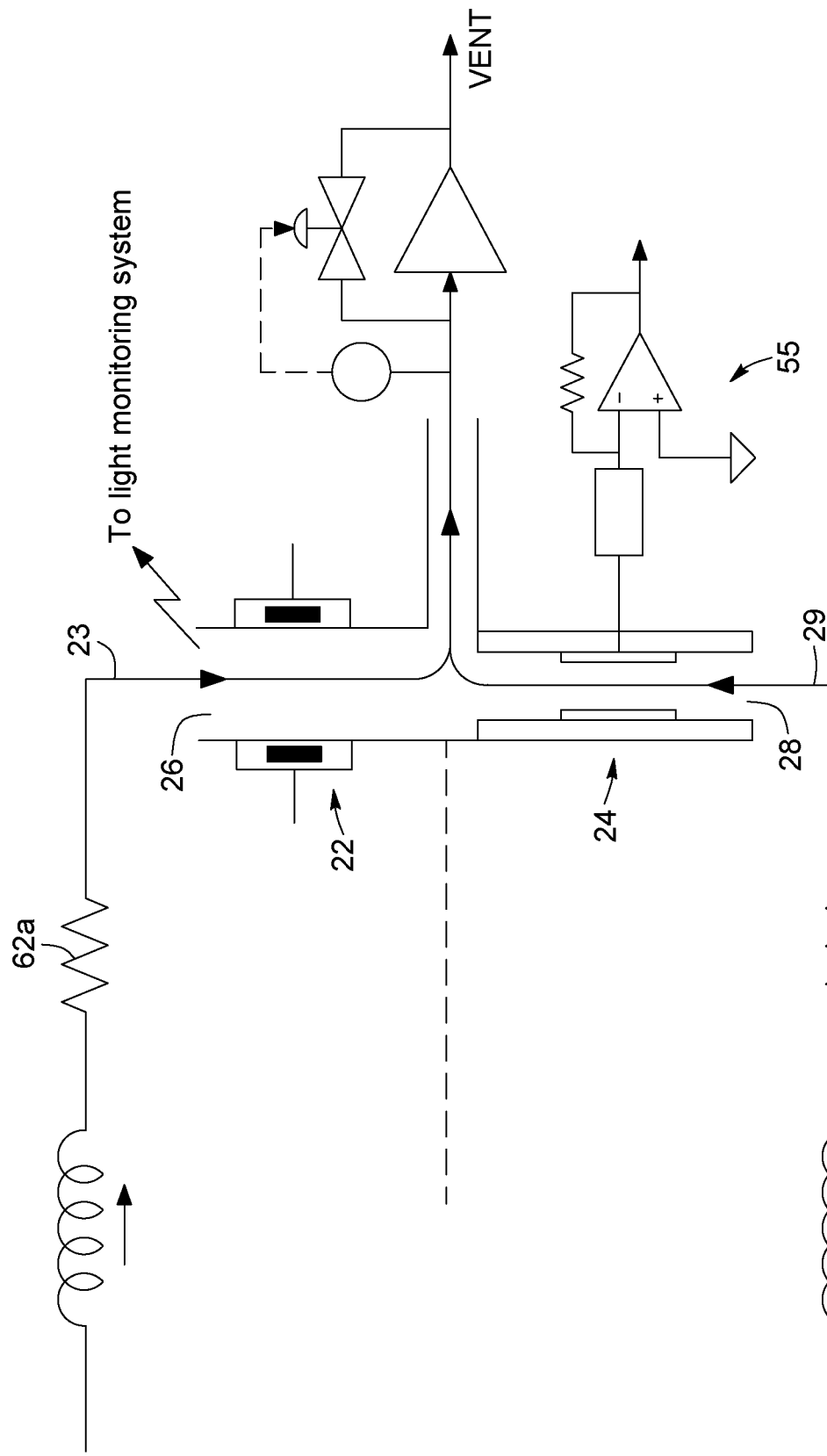

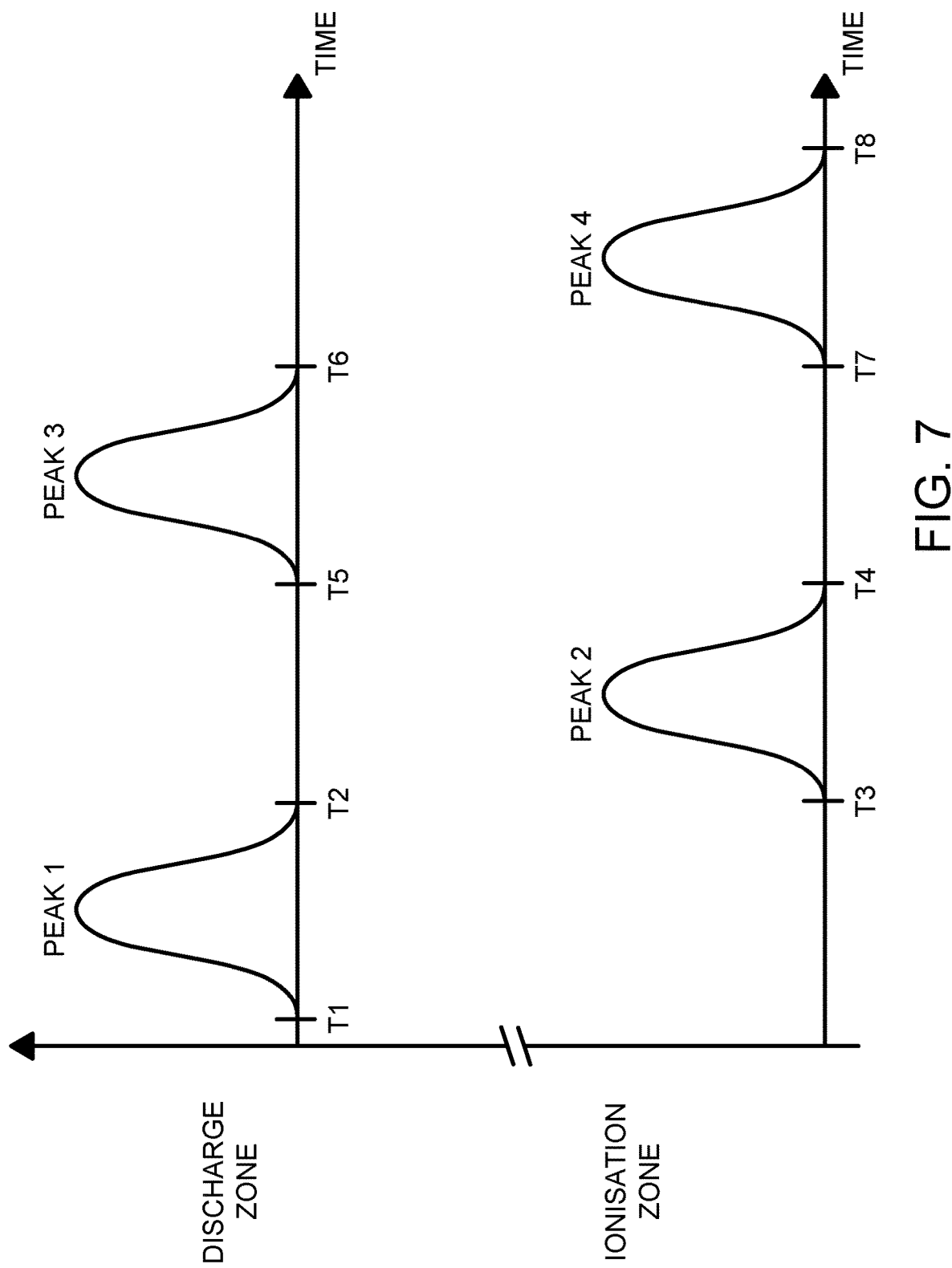

DISCHARGE-BASED PHOTO IONISATION DETECTOR FOR USE WITH A GAS CHROMATOGRAPHY SYSTEM

CROSS REFERENCE TO RELATED APPLICATIONS

This application claims the benefit of priority to U.S. Provisional Application No. 62/129,578, filed Mar. 6, 2015, which is incorporated by reference herein in its entirety, and is a 35 U.S.C. § 371 national stage application of PCT Patent Application No. PCT/CA2016/050242, filed Mar. 7, 2016, which is incorporated by reference in its entirety.

TECHNICAL FIELD

The technical field generally relates to a discharge-based photo ionisation detector and its use with a chromatography system.

BACKGROUND

Chromatography is a technical field where constituents of a gas sample are separated in order to be individually analysed. Typically, the gas stream outputted by a chromatography column includes one or more impurities or species to be detected carried by a carrier gas, different species being outputted at different moments in time.

Several types of detectors can be used to analyse the composition of the solute outputted by a gas chromatography system. One category of such detectors is Photo Ionisation Detectors (PID). Generally, PIDs are gas detection devices where the gas sample to be analysed is ionized by optical radiation. Photons of energy above the ionisation energy of the constituents of the gas to be analysed are impinged on the sample, breaking the molecules in the sample into free electrons and positively charged ions. This generates an electrical current in the gas sample which can be measured.

The high energy photons used to ionise molecules in a PID can come from various sources. For typical chromatography applications, helium discharge ionisation detectors are often used. FIG. 1 (PRIOR ART) schematically illustrated a basic configuration for a helium discharge ionisation detector as known in the art. Such a device includes a discharge zone where a pure helium gas is inserted, normally supplied from a gas purifier, and an ionisation zone in which the gas to be analysed is received. The discharge zone is submitted to a high voltage electrical field, generating a plasma from which radiation in the UV range is emitted. This radiation is used to ionize the constituents of the gas to be analysed in the ionisation zone.

A helium discharge ionisation detector such as shown in FIG. 1 requires a pure helium supply connected to the discharge zone. The extra helium injected into the detector contributes to dilute the impurities eluting from the chromatography column and inserted at the opposite side of the detector, since this volume of the helium gas is added to the volume of the sample.

There remains a need for improved discharge-based photo ionisation detectors suitable for chromatography applications.

SUMMARY

In accordance with one aspect, there is provided a discharge-based photo ionisation gas detector for analysing a gas sample, including a discharge zone and an ionisation zone.

The discharge zone includes a plasma chamber configured to receive a flow of a discharge gas therethrough, the plasma chamber having an outlet allowing optical radiation out of the discharge zone. The discharge zone further includes a plasma-generating mechanism configured to apply a plasma-generating field across the plasma chamber so as to generate a plasma from said discharge gas, and a plasma-localizing mechanism configured to apply a plasma-localizing field across the plasma chamber and positioned such that the plasma-localizing field localizes the plasma within the plasma chamber in alignment with the outlet.

The ionisation zone includes an ionisation region configured to receive a flow of the gas sample therethrough. The ionisation zone has an inlet allowing optical radiation from the discharge zone into the ionisation region. The ionisation zone further includes an ionisation-measuring mechanism configured to measure an ionisation current resulting from a photo ionisation of the gas sample in the ionisation region by the optical radiation.

In some implementations, the plasma-localizing mechanism includes a pair of localizing electrodes extending parallelly on opposite sides of the plasma chamber, the plasma-localizing field being an electrical field, and a power supply providing a DC or AC driving current to the localizing electrodes. Alternatively, the plasma-localizing mechanism may include a pair of localizing electromagnets extending parallelly on opposite sides of the plasma chamber, the plasma-localizing field being a magnetic field.

In some implementations, the plasma-generating mechanism includes a pair of discharge electrodes extending parallelly on opposite sides of the plasma chamber and separated by a discharge gap, and an alternating current generator providing an alternating discharge driving signal to the discharge electrodes. A pair of insulating dielectric barriers may extend within the discharge gap, each along a corresponding one of the discharge electrodes. In one variant, each insulating layer of said pair is defined by a wall of the plasma chamber.

In one embodiment, each discharge electrode of said pair includes a layer of conductive compound extending along an exterior surface of the corresponding wall of the plasma chamber. Each localizing electrode is embedded in a respective one of these discharge electrodes. The plasma-localizing mechanism may further include electrically-insulated contact wires connecting the discharge electrodes to the power supply.

In some implementations, the discharge zone and ionisation zone are disposed end-to-end, the discharge zone and the ionisation zone of the photo ionisation detector respectively comprising a discharge zone inlet and an ionisation zone inlet positioned at opposite extremities of said end-to-end configuration. The discharge-based photo ionisation gas detector may for example include a tubular enclosure, segments of this tubular enclosure defining the discharge zone and ionisation zone. One or more screen assemblies may be disposed in the tubular enclosure between the discharge zone and the ionisation zone. The screen assemblies may be grounded to act as collector electrodes. A flow vent may be provided through the tubular enclosure between the discharge zone and the ionisation zone, and the discharge-based photo ionisation gas detector may further include a pressure control system connected to this flow vent. Preferably, the segment of the tubular enclosure defining the ionisation zone has a reduced diameter.

In some implementations, the ionisation-measuring mechanism may include one or more ion-collecting electrodes disposed in the ionisation zone and a current measuring device connected to the ion-collecting electrodes. The one or more ion-collecting electrodes may for example define a grid, a plurality of rings, a pair of plates disposed in a parallel configuration, or a pair of spaced apart coaxial cylinders.

In some implementations, the plasma chamber may include at least one monitoring window. The discharge-based photo ionisation detector may further include a light monitoring system configured to detect light transmitted through said at least one monitoring window and analyse said light to identify gas species in the discharge gas.

In accordance with another aspect, there is provided a discharge-based photo ionisation gas detector for analysing a gas sample. The discharge-based photo ionisation detector includes a discharge zone configured to receive a flow of a discharge gas therethrough and generate a plasma from this discharge gas. The discharge zone has an outlet allowing optical radiation out of the discharge zone The discharge-based photo ionisation detector further includes a plasma-localizing mechanism configured to apply a plasma-localizing field across the discharge zone and positioned such that the plasma-localizing field localizes the plasma within the discharge zone in alignment with its outlet.

The discharge-based photo ionisation detector further includes an ionisation zone configured to receive a flow of the gas sample therethrough. The ionisation zone has an inlet allowing the optical radiation from the discharge zone into the ionisation zone to photo ionise the gas sample.

In accordance with some implementations, the plasma-localizing mechanism includes a pair of localizing electrodes extending parallelly on opposite sides of the discharge zone, the plasma-localizing field being an electrical field. The plasma-localizing mechanism may further include a power supply providing a DC or AC driving current to the localizing electrodes. A pair of discharge electrodes may extend parallelly on opposite sides of the discharge zone, and an alternating current generator may provide an alternating discharge driving signal to the discharge electrodes. A pair of insulating dielectric barriers may extend between the discharge electrodes, each along a corresponding one of the discharge electrodes. In one embodiment, each discharge electrode includes a layer of conductive compound, and the localizing electrodes are each embedded in a respective one of these discharge electrodes. Electrically-insulated contact wires may connect the discharge electrodes to the power supply.

In accordance with another aspect, there is provided a method of analysing a gas sample from a chromatography column. The method comprises:
 a) providing a discharge-based photo ionisation gas detector having a discharge zone and an ionization zone;
 b) splitting the gas sample into a first sample stream and a second sample stream;
 c) circulating the first sample stream through the discharge zone and applying a plasma-generating field across the discharge zone to generate a plasma from said first sample stream, the plasma emitting optical radiation;
 d) circulating the second sample stream through the ionisation zone and exposing said second sample stream to the optical radiation from the discharge zone, thereby generating an ionisation current by photo ionisation of the second sample stream by said optical radiation; and
 e) measuring said ionisation current.

In some implementations, the discharge zone and ionisation zone of the photo ionisation detector are disposed in an end-to-end configuration. The discharge-based photo ionisation detector may include a discharge zone inlet and an ionisation zone inlet positioned at opposite extremities of said end-to-end configuration, the first sample stream being injected in the discharge zone through the discharge zone inlet, and the second sample stream being injected in the ionisation zone through the ionisation zone inlet.

In some implementations, the may further comprise a step of controlling a pressure in the discharge zone and the ionisation zone using a pressure control system positioned between the discharge zone and ionisation zone. The pressure control system may maintain the discharge zone and the ionisation zone at atmospheric pressure or below atmospheric pressure.

In some implementations, the first and second sample streams obtained from the splitting of step b) have a same volume.

In some implementations, the method may further comprise detecting light from the plasma and analysing this light to identify gas species in the first sample stream.

In accordance with yet another aspect, there is provided a method of analysing a sample gas stream, comprising:
 a) providing a discharge-based photo ionisation gas detector having a discharge zone and an ionization zone;
 b) circulating a discharge gas stream through the discharge zone, the discharge gas stream comprising a carrier gas and impurity peaks time-separated by a chromatography column;
 c) applying a plasma-generating field across the discharge zone during interstitial moments between said impurity peaks in the discharge gas stream circulating through the discharge zone, thereby generating a plasma from the carrier gas in said discharge gas stream, the plasma emitting optical radiation;
 d) circulating the sample gas stream through the ionisation zone in synchronicity with the generation of the plasma in the discharge zone and exposing said sample gas stream to the optical radiation from the discharge zone, thereby generating an ionisation current by photo ionisation of the sample gas stream by said optical radiation; and
 e) measuring said ionisation current.

The carrier gas of the discharge gas stream may be is helium.

In some implementations, the discharge gas stream originates from a purified gas source.

Alternatively, the discharge gas stream may originate from a chromatography sample. The chromatography sample may be split into the discharge gas stream and sample gas stream. In one embodiment, the circulating of steps b) and c) comprises synchronizing a passage of the interstitial moments in the discharge gas stream through the discharge zone with a passage of impurity peaks in the sample gas stream through the ionisation zone. The method may further comprise detecting light from the plasma and analysing this light to monitor the passage of the interstitial moments in the discharge gas stream through the discharge zone.

In some implementations, the discharge zone and ionisation zone of the photo ionisation detector are disposed in an end-to-end configuration, and the discharge-based photo ionisation detector may include a discharge zone inlet and an ionisation zone inlet positioned at opposite extremities of this end-to-end configuration, the discharge gas stream being injected in the discharge zone through the discharge zone inlet, and the sample gas stream being injected in the ionisation zone through the ionisation zone inlet.

In some implementations, the method may further comprise a step of controlling a pressure in the discharge zone and the ionisation zone using a pressure control system positioned between the discharge zone and ionisation zone.

Other features and advantages of the invention will be better understood upon a reading of the following description of embodiments thereof with reference to the appended drawings.

BRIEF DESCRIPTION OF THE DRAWINGS

FIG. 6 is a schematized representation of a use of a discharged-based photo ionisation detector using input from two different chromatography columns both fed by sample streams.

FIG. 7 is a graph showing the synchronicity of interstitial moments between impurity peaks and impurity peaks and in the discharge zone and ionisation zone, respectively.

DETAILED DESCRIPTION

In accordance with embodiments, there is provided a discharge-based photo ionisation detector (discharge-based PID) as well as methods using such a PID, in particular in conjunction with a gas chromatography system.

As will be readily understood by one skilled in art, the expression "gas chromatography" refers to various techniques and set ups allowing the separation of constituents in a gas sample. Gas chromatography systems may include a variety of components interacting to achieve the desired separation, including one or more "columns" in which the separation takes place. The column may be embodied by tubes or other support containing a medium in which different gas species travel at different speeds, leading to their output as "impurity peaks" separated in time. The gas stream outputted by a chromatography column therefore includes one or more impurities or species to be detected carried by a carrier gas, different species being outputted at different moments in time. The species to be detected may for example be hydrogen ($H_2$), argon (Ar), oxygen ($O_2$), methane ($CH_4$), carbon monoxide (CO), carbon dioxide $CO_2$), water ($H_2O$), hydrocarbons, BTEX compounds, etc. Different types of carrier gases may also be selected depending on the application and the particularities of a given chromatography system. Typical carrier gases include argon (Ar), helium (He), nitrogen ($N_2$), hydrogen ($H_2$) and oxygen ($O_2$).

Discharge-Based Photo Emission Detector

Figure 1:
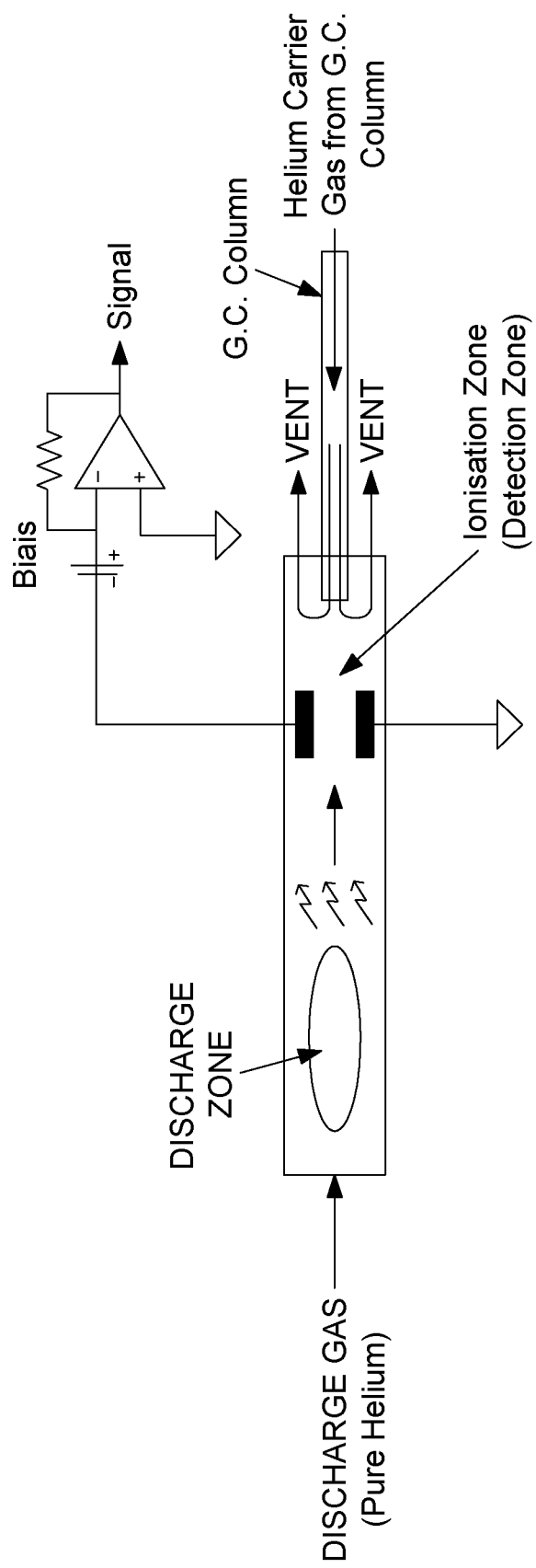
FIG. 1 (PRIOR ART) is a schematized representation of of a photo ionisation detector according to prior art.
Figure 2:
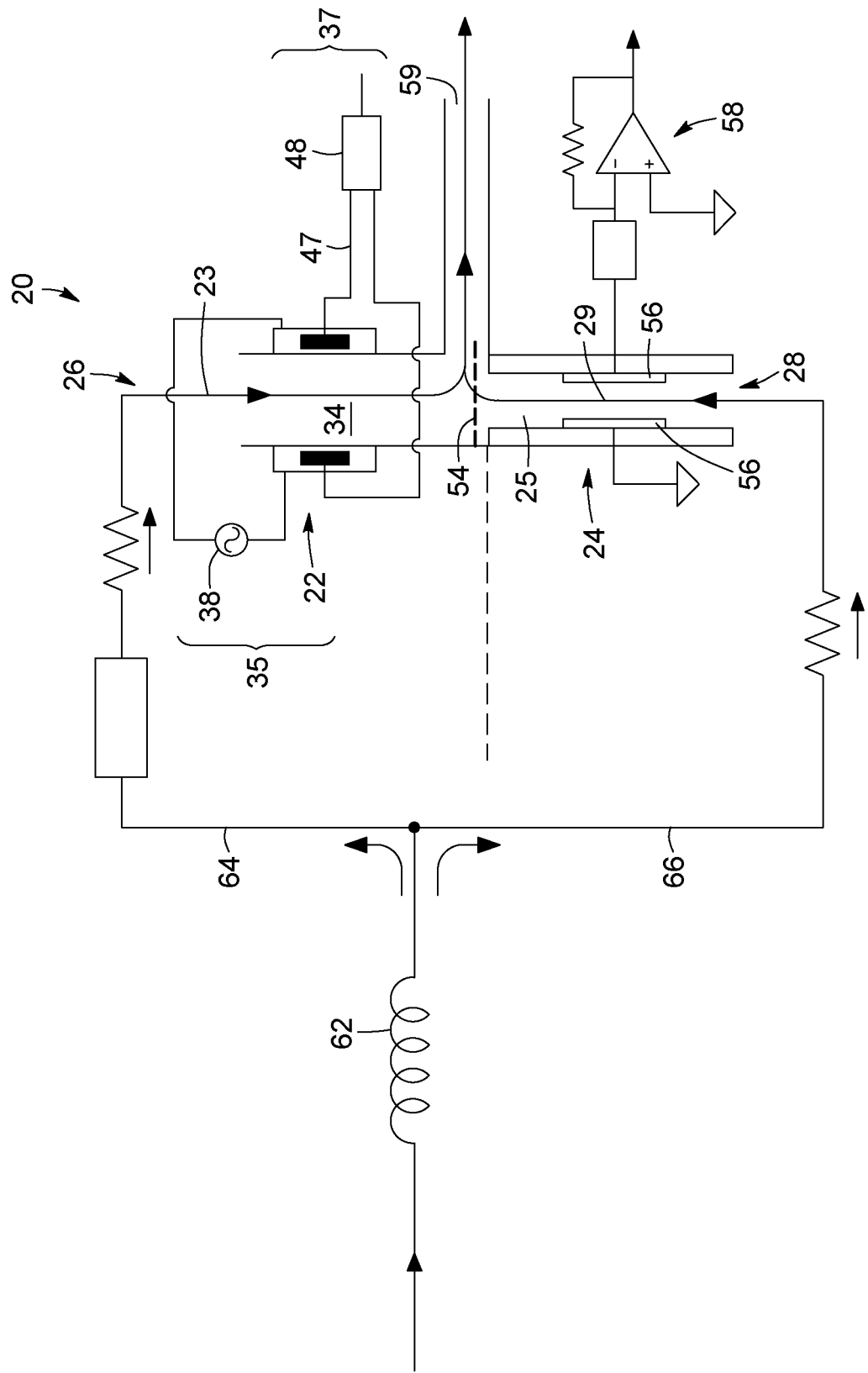
FIG. 2 is a schematized representation of a discharge-based photo ionisation detector according to one embodiment, using a split input from a chromatography column.

With reference to FIG. 2, there is shown a discharge-based PID 20 according to one embodiment.

The discharge-based PID 20 may be used for analysing a gas sample. In some implementations, the gas sample may originate from a chromatography column, and as explained above, include a carrier gas flow in which various impurity species are present in time-separated impurity peaks. It will however be understood that some variants of the discharge-based PID 20 may be used to analyse samples in different applications than gas chromatography.

The discharge-based PID 20 includes a discharge zone 22 and an ionisation zone 24. The discharge zone 22 receives a flow of a discharge gas 23, whereas the ionisation zone 24 receives a flow of the gas sample 29. In the illustrated configuration the discharge zone 22 and ionisation zone 24 are disposed end-to-end, a discharge zone inlet 26 and an ionisation zone inlet 28 being provided at opposite extremities of the end-to-end configuration. Other configurations may however be envisioned without departing from the scope of the invention.

The discharge zone 22 is configured to receive the flow of a discharge gas 23 therethrough. A plasma-generating mechanism 35 is provided and configured to apply a plasma-generating field across the discharge zone 22 so as to generate a plasma from the discharge gas 23. The discharge gas 23 therefore undergoes a transformation under the applied plasma-generating field. Chemical compounds are ionised and decomposed by collisions with energetic electrons and molecules and atomic components are excited to higher energy levels, emitting radiation in the de-excitation process characteristic of the spectral properties of the species present in the gas.

A portion of this optical radiation reaches the ionisation zone 24, where the interaction of this optical radiation with the gas sample flow 29 leads to ionisation of impurity species present in the gas sample. It will be readily understood that although photo ionisation is the principal mechanism leading to ionisation, typically helium or other components in the discharge gas excited to a metastable state may also travel into the ionisation zone 24 and transfer energy to components of the gas sample to be ionised without the emission of radiation, contributing to the ionisation process (penning ionisation).

Figures 3, 3A:
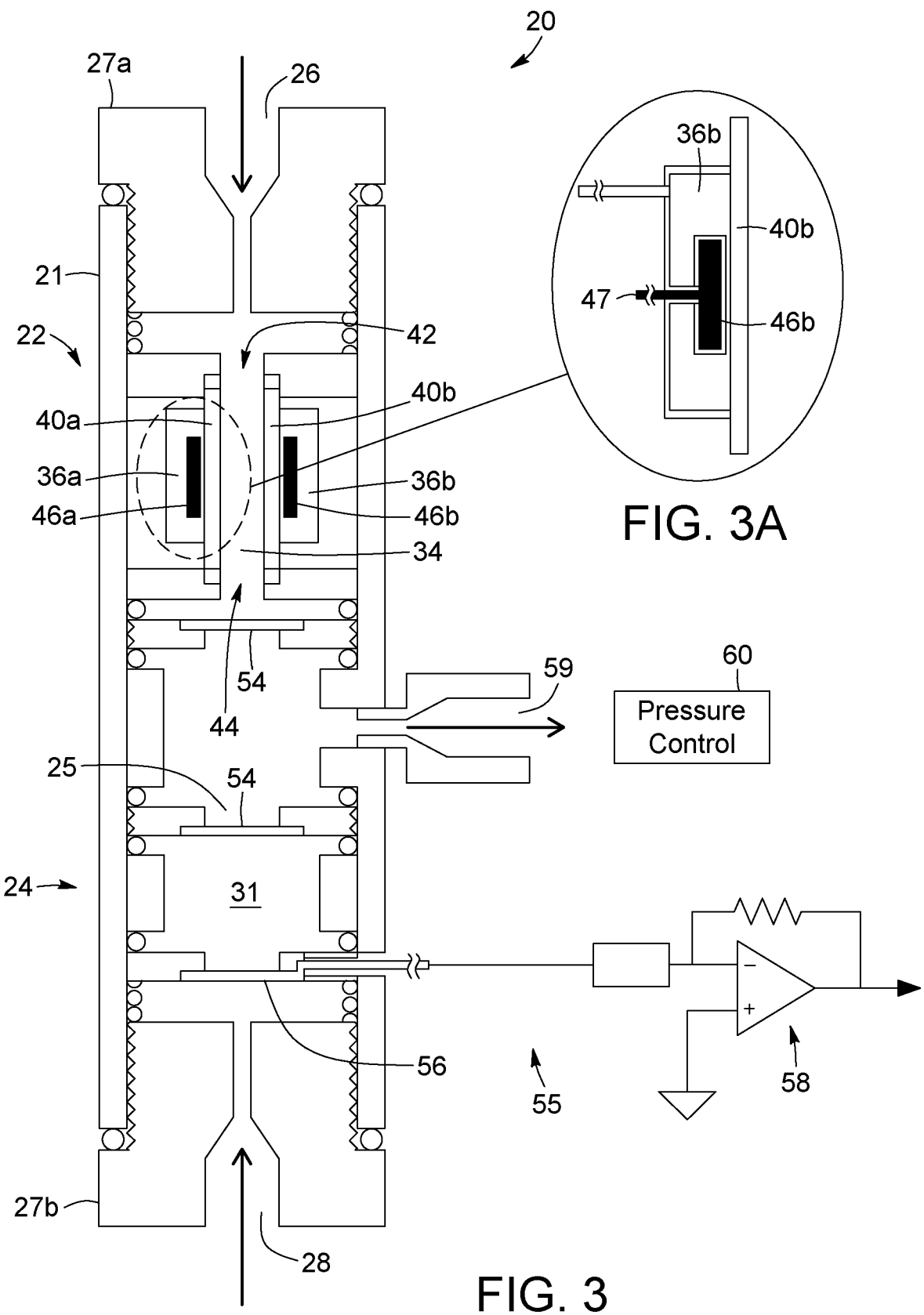
FIG. 3 is a cross-sectional partially schematized view of a discharge-based photo ionisation detector according to one embodiment.
FIG. 3A is an enlarged view of a portion of the photo ionisation detector of FIG. 3.

Referring still to FIG. 2 and additionally to FIG. 3, the configuration of the PID 20 according to one possible implementation is illustrated in more detail.

In this configuration, the PID 20 includes a tubular enclosure 21 in which are provided the discharge zone 22 and the ionisation zone 24 in the end-to-end configuration. The discharge zone 22 and the ionisation zone 24 are defined by segments of the tubular enclosure 21. The segment defining the discharge zone 22 preferably has a flattened shape which forms a plasma chamber 34. The plasma chamber 34 may be embodied by any enclosure suitable to host a plasma. Also preferably, the segment of the tubular enclosure 21 defining the ionisation zone 24 has a reduced diameter, forming an ionisation region 31. The discharge zone inlet 26 and ionisation zone inlet 28 are for example embodied by flow orifices through a pair of plugs 27a, 27b mounted to opposite extremities of the tubular enclosure 21 through spring loading mechanisms. O-ring and/or other sealing components may be provided as is well known in the art.

In the illustrated embodiment of FIG. 3, one or more screen assemblies 54 are provided in the tubular enclosure 21 between the discharge zone 22 and the ionisation zone 24. The screen assemblies 54 are grounded and act as collector electrodes, preferably prevent electrical charges such as ions and electrons from exiting the discharge zone 22 and enter the ionisation zone 24. The screen assemblies may include a simple grid, ring or coaxially arrange electrodes. Other appropriate configurations could also be used. It will be readily understood that such a screening process contributes to reducing background current and noise, as it ensures that most of the ionisation current detected in the ionisation zone 24 is generated by helium photon emission and metastable.

Preferably, the PID 20 further includes a flow vent 59 provided through the tubular enclosure 21 between the discharge zone 22 and the ionisation zone 24. In one variant, a pressure control system 60 may be provided in conjunction with the flow vent 59. Advantageously, operating the pressure control system through flow vent 59 can be done without disturbing the discharge pressure of the chromatography column.

The pressure control system 60 may be operated to control the operating pressure in the PID 20, and maintain both the discharge zone 22 and the ionisation zone 24 at a desired pressure, for example atmospheric pressure, preventing pressure variations from negatively affecting the operating conditions in the discharge and ionisation zones 22 and 24. In some implementations, the pressure control system 60 may additionally be used to decrease the operating pressure below atmospheric, which can improve peak shape by reducing peak broadening effects through a virtual reduction of the internal volume of the discharge-based PID 20.

Still referring to FIG. 3, and as mentioned above, the PID 20 further includes a plasma-generating mechanism 35. In this embodiment, the plasma-generating mechanism relies on Dielectric Barrier Discharge (DBD). DBD involves the use of a pair of discharge electrodes 36a, 36b extending parallelly on opposite sides of the plasma chamber 34 and separated by a discharge gap, in which is provided one or more insulating dielectric barrier. Preferably, a pair of insulating dielectric barriers is provided, each dielectric barrier extending within the discharge gap along a corresponding one of the discharge electrodes 36a, 36b. In the illustrated implementation, opposite walls 40a, 40b of the plasma chamber 34 may be made of an insulating material such as quartz and act as the dielectric barriers of the DBD process. The discharge gas is provided in the discharge gap. An alternating current generator 38 (see FIG. 2) provides a high voltage alternating discharge driving signal to the discharge electrodes 36a, 36b, which leads to the breakdown of the discharge gas, creating the plasma-generating field across the plasma chamber 34 and leading to the creation of the plasma medium in the discharge gap. The presence of the dielectric barrier limits the average current density in the plasma. It also isolates the discharge metal electrodes from the plasma, avoiding sputtering or erosion.

One skilled in the art will readily understand that the alternating current generated by the alternating current generator 38 preferably has a peak voltage and frequency selected in view of the nature of the discharge gas and operating conditions in the plasma chamber 34, in order to favor breakdown of the discharge gas and generation of a plasma. It will be readily understood that the peak voltage required to create a discharge depends on several application-specific factors, such as the ease of ionisation of the discharge gas. For example, at atmospheric pressure the ionisation of helium requires a voltage of about 2 kV peak to peak. Operating at lower pressure can significantly decrease the required voltage to achieve ionisation.

It will however be understood that different shapes and configurations for the plasma chamber, dielectric barriers and discharge electrodes can easily be envisioned without departing from the scope of the invention. Furthermore, in other configurations the plasma-generating mechanism may involve other schemes than DBD, such as for example a Pulsed DC discharge, a Continuous DC discharge, an AC discharge with the electrodes in the discharge gas, a glow discharge, etc.

As will be readily understood by one skilled in the art, the plasma generated through DBD configurations such as described herein typically constitutes a "soft plasma" maintained in a non-thermal equilibrium regime. In such plasma, the momentum transferred between electrons and heavy particles such as ions and neutral particles is not efficient, and the power coupled to the plasma favors electrons. The electron temperature ($T_e$) is therefore considerably higher than the temperatures associated with ion ($T_i$) and neutral particles ($T_n$). In other words, the electrical energy coupled into the plasma is mainly transferred to energetic electrons, while the neutral gas and ions remain close to ambient temperature and exploits the more appropriate behaviour, characteristic or phenomenon of the plasma discharge.

Still referring to FIG. 3, as mentioned above the plasma chamber 34 preferably has a flat configuration and has a chamber inlet 42 in fluid communication with the discharge zone inlet 22 and a chamber outlet 44 disposed opposite the chamber inlet 42, allowing a gas flow through the plasma chamber 22. The chamber outlet 44 acts as the outlet allowing optical radiation out of the discharge zone 22. It will be readily understood by one skilled in the art that typically only a portion of the energetic photons emitted by the plasma will escape the plasma chamber 34 through the chamber outlet 44, and that additionally the chamber outlet 44 will also allow other plasma products such as ions and metastables to exit the plasma chamber 34 and discharge zone 22.

Referring to both FIGS. 2 and 3, the discharge zone 22 of the discharge-based PID 20 includes a plasma-localizing mechanism 37 configured to apply a plasma-localizing field across the plasma chamber 34 and positioned such that the plasma-localizing field localizes the plasma within the plasma chamber 34 in alignment with the chamber outlet 44.

Plasma stability may be improved by applying a localizing electrostatic, magnetic or electromagnetic field in the discharge gap. As the plasma within the plasma chamber 34 is a charged medium, it can be extended, compressed or moved under the influence of such fields. Advantageously, stabilizing the plasma may help localizing the discharge at a desired position, for example in alignment with the longitudinal axis crossing the discharge zone 22 and the ionisation zone 24, and therefore with the chamber outlet 44. In this manner the transfer of photons and metastable from the discharge zone 22 into the ionisation zone 24 can be optimised. Plasma localisation may also be of particular usefulness to enable a stable plasma reaction in implementations where the discharge gas contains impurities.

Referring to FIG. 3 and more particularly to FIG. 3A, in the illustrated embodiment the discharge electrodes 36a, 36b are compound electrodes, that is, they are embodied by a layer of conductive compound extending along an exterior surface of the corresponding wall 40a, 40b of the plasma chamber 34. The plasma-localizing mechanism 37 includes a pair of localizing electrode 46a, 46 each embodied by a floating electrode embedded in a respective one of the discharge electrodes 36a, 36b. The localizing electrodes 46a, 46b are electrically connected through electrically-insulated contact wires 47 to a power supply 48 (see FIG. 2) applying a DC or AC driving current to the localizing electrodes 46a, 46b. It will however be readily understood that in other embodiments the position and configuration of electrodes generating the localizing field may differ. In other embodiments, electromagnets (not shown) may be provided along opposing side walls of the plasma chamber in order to create a magnetic field in the plasma chamber.

Figure 4:
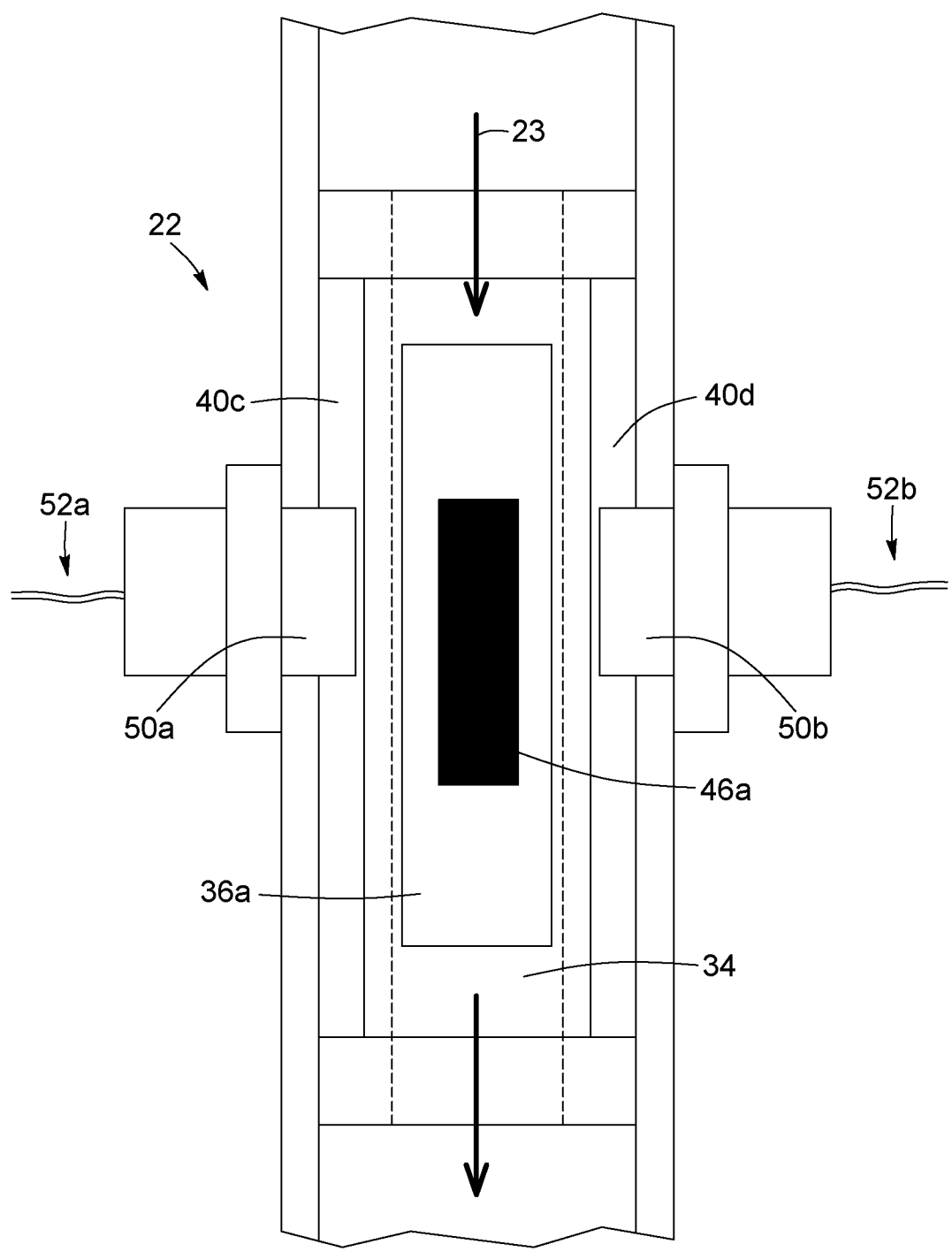
FIG. 4 is a cross-sectional side view of a portion of the photo ionisation detector of FIG. 3.

In some implementations, the light emitted in the discharge zone 22 may additionally be used to identify the gas species present in the discharge gas 23. Such an approach may be of particular usefulness in implementations where the discharge gas is embodied by a stream of the gas sample to be analysed, as described in more details below. As the radiation emitted from the plasma is characteristic of the spectral properties of the species present in the discharge gas 23, processing this radiation can therefore provide information on the nature and relative concentration of the species in the discharge gas. Referring to FIG. 4, there is shown a top view of a design of the discharge zone 22 enabling such a feature. In this embodiment, the plasma chamber 34 includes a pair of windows 50a, 50b provided through side walls 40c, 40d transversal both to the axis of the plasma-generating field and the longitudinal discharge gas flow axis. Of course, a different number of windows may be provided, such as a single window or more than two, in alternative embodiments and other window configurations may be envisioned. The windows 50a, 50b preferably allow optical emissions within a spectral range of interest to be transmitted out of the plasma chamber 34. Suitable materials for such windows may for example include quartz, $CaF_2$ or $MgF_2$ which can be particularly transparent to UV radiation, ZnSe materials for measurements in the infrared spectrum, etc. In other implementations, one or more of the windows 50a, 50b may be made or fluorescent glass. Such embodiment may for example be useful for applications where the spectral lines of interest are in the UV range and it is desirable to maximize sensitivity, while reducing noise and drift. The fluorescent glass may get excited by UV radiation, and will generate emission in the visible range, upon de-excitation.

The discharge-based PID 20 according to this embodiment further includes a light monitoring system configured to detect light transmitted through the monitoring window 50 and analyse this light to identify gas species in the discharge gas 23. For example, the light transmitted through each of the windows 50a, 50b may be collected by a suitable light collecting assembly 52a, 52b. The light collecting assemblies may include lenses, optical fibers and/or other optical components collecting, guiding, transforming, or otherwise affecting light. Preferably, the collected light is detected and processed as well known in the art. For example, light may be filtered by an interferential filter or the like, for example a bandpass filter centered on a wavelength or wavelength range to be monitored, and detected by a photodiode converting the light to an electrical signal. In other variants, a standard optical spectrometer instrument could alternatively be use. More details on light detection and processing may for example be found in the provisional application to the same inventor as the current application filed on the same day and entitled "MULTI-MODE PLASMA-BASED GAS DETECTOR USING OPTICAL SPECTROSCOPY", the entire contents of which are enclosed herewith by reference.

Referring back to FIGS. 2 and 3, the components of the ionisation zone 24 according to the illustrated implementation will now be described in more details. The ionisation zone 24 has an inlet 25 allowing optical radiation from the discharge zone 22 into the ionisation region 31. In one embodiment, the inlet 25 may simply be embodied by the portion of the tubular enclosure 21 allowing both light and metastables from the plasma to circulate substantially along the longitudinal axis of the tubular enclosure 21, and therefore enter the ionisation zone 24. As mentioned above, in some implementations the segment of the tubular enclosure 21 embodying the ionisation region 31 may have a reduced diameter, which may lead to a more uniform distribution of the photons from the discharge zone 22 through the ionisation zone 24.

The discharge-based PID 20 further includes an ionisation-measuring mechanism 55 configured to measure an ionisation current resulting from the photo ionisation of the gas sample 29 in the ionisation region 31 by the optical radiation from the discharge zone 22. The ionisation-measuring mechanism 55 preferably includes one or more biased ion-collecting electrodes 56 disposed in the discharge zone 24. The ion-collecting electrodes 56 may be embodied by any electrically conductive surface disposed in the ionisation region 31 so as to measure the ionisation current, and may take different shapes, such as: grid, rings, plates disposed in a parallel configuration, coaxial cylinders having a space therebetween allowing gas and photon circulation, etc.

The ionisation-measuring mechanism 55 further includes current a measuring device 58 connected to the ion-collecting electrodes 56. The current measuring device 58 outputs an electrical signal proportional to the amount of ions present in the ionisation zone 24. For example, the ionisation may be measured by the traditional electrometer i.e. a current to voltage op-amp configuration also called trans-impedance amplifier configuration. A current integration configuration may also be used. In another variant, a logarithm amplifier configuration may be used to advantageously eliminate the noise and drift associated with high value feedback resistance of traditional current to voltage op-amp configuration. Such a variant also allows a high gain to be set without a high value resistance, facilitating an offset or signal baseline correction.

Operation of the discharge-based PID 20 can be carried out as follows. The AC driving signal from the AC current generator 38 is applied to the discharge electrodes 36a, 36b, generating an electrical field therebetween to ignite the discharge in the plasma chamber 34. Once the plasma start, the voltage of the AC driving signal may optionally be reduced, as lesser voltage is necessary to maintain the ongoing discharge. The shape and position of the plasma are then preferably fine-tuned through the localizing electrodes 46a, 46b. While an electrostatic field generated through a DC voltage can provide a suitable localisation of the plasma in the plasma chamber, in other variants an AC signal having a phase shift with respect to the plasma-generating AC drive signal may alternatively be used.

In one variant, the AC driving signal may take the form of an AC signal burst, generating plasma pulses of fixed length. Such a variant advantageously provides the possibility of measuring the signal current generated by the ionisation of impurities in either a continuous mode or in a time resolved manner. When using an AC burst signal to drive the plasma discharge, the current measuring device 58 may be tuned to the burst frequency, reducing further the noise and electronic DC drift. Typical synchronized rectification electronic circuit may be use.

In embodiments using optical emission detection such as explained above with reference to FIG. 4, the measured optical signal may serve several purposes. On the one hand, it can provide a spectroscopy signature of the discharge gas 23. Also it may be used as a feedback signal to stabilize and optimize the position of the discharge, therefore ensuring a maximum flow of photons and metastables in the ionisation zone to optimize the ionisation process.

Plasma emission monitoring can also be used to maintain the intensity of the plasma constant. This is for example achieved by tuning the power of the discharge and the voltage or frequency applied to the localizing electrodes 46a, 46b between detection cycles. The monitored plasma emission intensity can be used to re-adjust the plasma power before the next detection cycle is started.

Embodiments of the discharge-based PID 20 described above may be operated using difference sources of discharge gas, such as for example a purified helium supply as well known in the art. In other variants, such as described below, gas streams outputted by chromatography columns my alternatively be used to as discharge gas for the discharge-based PID 20 above or other photo ionisation gas detectors, as described below.

Splitting of Output from a Chromatography Column

In accordance with one aspect, there is provided a method of analysing a gas sample from a chromatography column.

The method first includes providing a discharge-based photo ionisation gas detector having a discharge zone and an ionization zone. The discharge-based PID may be embodied by one of the variants described above, or by another photo ionisation detector apt to perform the steps below.

The method next includes splitting the gas sample into a first sample stream 64 and a second sample stream 66. Referring for example to FIG. 2, this may involve separating the output from a chromatography column 62 along two different gas paths. Each sample stream 64 and 66 is therefore composed of a carrier gas flow containing impurity peaks separated in time. The first sample stream 64 circulates through the discharge zone 22 of the discharge-based PID 20, and a plasma-generating field is applied across the discharge zone 22 to generate a plasma from the first sample stream 64, the plasma emitting optical radiation. Parallely, the second sample stream 66 is circulated through the ionisation zone 24 and exposed to the optical radiation from the discharge zone 22, thereby generating an ionisation current by photo ionisation of the second sample stream 66 by this optical radiation. As explained above, the ionisation current is measured to obtain an electrical signal representative of the impurities in the gas sample.

It will be readily understood that the splitting of the gas stream from the chromatography column is preferably even, but that in some implementations, the first and second sample stream 64 and 66 may have different volumes.

Advantageously, in this configuration, operation of the PID 20 does not require a separate supply of helium or other carrier gas; the helium or other carrier gas in the first sample stream 64 is used as a discharge gas for the generation of the plasma emitting the photo ionising radiation.

The method above may be performed at atmospheric pressure, or at sub-atmospheric pressure. A pressure control system such as described above may advantageously be used to maintain the pressure at a constant value.

In typical implementations, the PID and method described above may be used to process gas sample using helium as a carrier gas. In other variants, a different type of carrier gas may be used. For example, argon may be used as carrier gas if impurities in argon are to be measure, or when it is desirable to reduce the energy available for impurities ionisation in the ionisation zone 24. In this approach the detector will be blind to impurities having a higher ionisation potential than argon. Detecting light from the plasma and analysing this light to identify gas species in the first sample stream, for example using a light monitoring system such as described above, may be of use under argon to measure impurities undetectable through the ionisation process. This variant may benefit from decreasing the operating pressure of the PID. Indeed, when operating at low pressure, it is possible to monitor optical emission from impurities having a higher ionisation potential than the background gas.

Use of Outputs from Distinct Chromatography Columns

Figure 5:
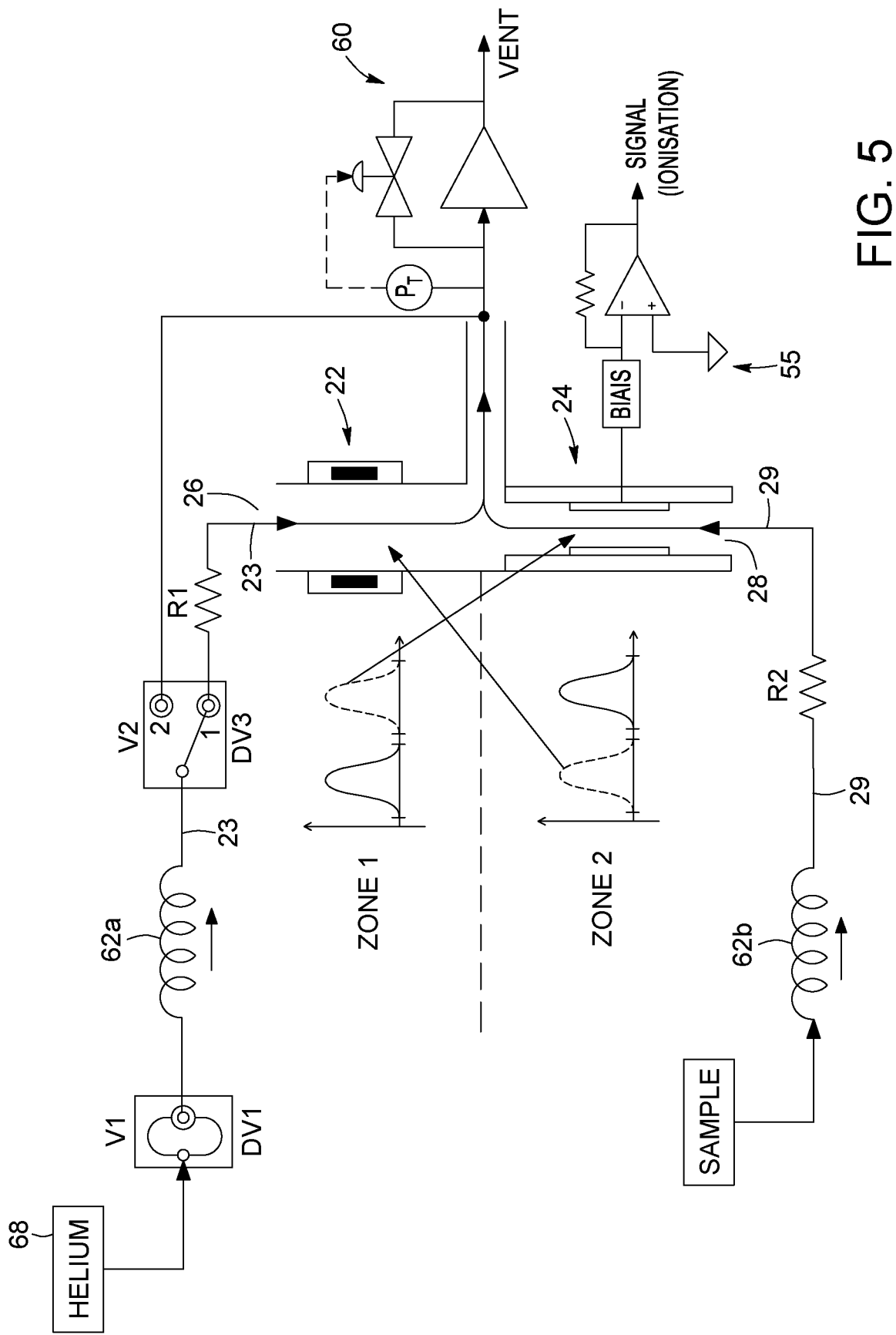
FIG. 5 is a schematized representation of a use of a discharged-based photo ionisation detector using input from two different chromatography columns respectively fed by a purified gas source and a sample stream.

With reference to FIG. 5, there is shown another method of analysing a sample gas stream using of a discharge-based PID having a discharge zone and an ionization zone, in accordance with another aspect.

This method involves circulating a discharge gas stream 23 through the discharge zone, the discharge gas stream comprising a carrier gas and impurity peaks time-separated by a chromatography column. In the embodiment of FIG. 5, the discharge gas stream 23 originates from a purified gas source 68, for example a helium supply. One of the drawbacks of existing helium-based discharge gases is that even "pure" helium from helium suppliers typically contains impurities. Similarly, if a heated getter purifier is use to purify helium, some impurities are not removed and their concentration can vary greatly from one gas cylinder to the next. In particular, neon and argon are usually present in some measure in a pure helium gas supply, as they are inert gases not trapped by gas purifiers. For some applications, it may be desirable to provide a helium stream as pure as possible as the discharge gas, to maximize photon and metastable generation and minimize quenching induced by neon and argon impurities, which decreases the discharge mechanism.

In the illustrated embodiment of FIG. 5, a chromatography column 62a of a chromatography system may be used in order to purify helium or other gas for use as the discharge gas of the plasma-generating process. In this embodiment, the column 62a dedicated to purification of the discharge gas is fed with a carrier gas of purified helium 68, obtained commercially or purified through a getter purification system. As explained above, such a helium stream typically contains neon and argon impurities. By circulating the helium gas stream through the chromatography column 62a operated in the usual manner, these impurities are time-separated by the chromatography column 62a, leading to and output discharge gas stream 23 of helium carrier gas in which impurity peaks have been separated in time. This process leaves interstitial moments between impurity peaks in the gas stream where the only gas present is the carrier gas—further "purified" helium.

The method next involves applying a plasma-generating field across the discharge zone 22 during the interstitial moments between said impurity peaks in the discharge gas stream 23 circulating through the discharge zone 22. A plasma is therefore generated only from the carrier gas in the discharge gas stream 23, the plasma emitting optical radiation for use in the photo ionisation process. In other words, through a proper control of the timing of the discharge, the purified helium can be used as the discharge gas when it traverses the plasma chamber 24.

The sample gas stream 29 of the gas to be analysed is circulated through the ionisation zone 24 in synchronicity with the generation of the plasma in the discharge zone 22. Preferably, the gas sample stream 29 is outputted from a different chromatography column 62b. The sample gas stream 29 is exposed to the optical radiation from the discharge zone 22, thereby generating an ionisation current by photo ionisation of the sample gas stream by this optical radiation, and this ionisation current is measured as explained above.

Advantageously, this approach can result in an excellent sensitivity and clean baseline.

In some implementations, the PID 20 used to carry out the method above includes the same elements as disclosed above with reference to FIG. 2, Preferably, the discharge zone 22 and ionisation zone 24 are disposed in an end-to-end configuration, and a discharge zone inlet 26 and an ionisation zone inlet 28 are positioned at opposite extremities of this end-to-end configuration, the discharge gas stream 23 being injected in the discharge zone 22 through the discharge zone inlet 26, and the sample gas stream 29 being injected in the ionisation zone 22 through the ionisation zone inlet. However, in this case, the discharge zone inlet 26 and the ionisation zone inlet 28 are in fluid communication with the output of two different chromatography columns. Other configurations of the discharge-based PID may however be envisioned without departing from the scope of the invention.

In the illustrated embodiment of FIG. 5, the first chromatography column 62 is fed with a pure helium gas stream 68 as explained above. A first valve V1 upstream the first column 62a controls the helium gas flow to the first column 62a. A second valve V2 is provided between the first column 62a and the discharge zone inlet 26. The second valve V2 can be switched between port 1 and port 2, respectively directing the discharge gas stream outputted by the first column 62a to the discharge zone inlet 26 or to a flow vent 59. A pressure control system 60 as explained above may be provided to maintain the discharge zone and ionisation zone at a constant pressure, either atmospheric or under atmospheric. The ionisation zone inlet 28 is connected to the output of the second chromatography column 62b, which can be part of a same chromatography system as the first column 62a or a different one. The second column 62b is fed with the sample to be analysed containing impurities in a helium carrier gas.

In one example of use of this approach, the system illustrated in FIG. 5 may be operated as follows:

The first column 62a, used here as the source of discharge gas, is first purged of any residual gas by closing valve V1 upstream the first column 62a, and, through port 1 of valve V2, connecting the discharge side of the first column 62a to a vacuum pump. The first column 62a may be heated during this process. Once the purge has been completed, the first column 62a is set back at ambient temperature, or below, for example using a Peltier Thermo Cooler. Then port 1 of valve V2 is closed back, the first column 62a in "standby mode", at sub-atmospheric pressure.

An analytical cycle is then started with the following sequence of event:
1. The sample to be measured is injected into the second column 62b, which is connected to the ionisation zone 24 of the PID;
2. Before a first impurity starts eluting from the second column 62b, valve V1 and port 2 of valve V2 are open, pressurising column 1 with the gas stream from a pure helium supply. Under the action of this pressurisation and the linear flow through column 1, the first column 62a will perform impurities separation according to its usual operation. Neon will come out relatively quickly and first, while argon will be delay for some time, which can be well over 1 minute. This timing is dependent of column size, packing material, flow and operating temperature and pressure. A flow restrictor may be use between the outlet of the first column 62a and valve V2 to increase the volume of pure gas available for the discharge. In this manner, clean and pure helium without any impurities is available for the discharge gas.

Various packing material can be use in the first column 62a, as is well known in the art, such as ion exchange zeolites, standard zeolites, molecular sieves 5A, porous polymers, etc. The size of the first column 62a is preferably much larger than the size of the second column 62b. The second column 62b may for example be embodied by a plot, or capillary column, while the first column 62a preferably has a diameter of ⅛" or ¼". In this manner, a stable flow of purified helium can be available during the entire sample analysis cycle.

At the end of the G.C. run, once all the impurity peaks of interest from the second column 62b have been quantified, the following steps may be taken:

Port 2 of valve V2 is closed and port 1 of valve V2 port 1 is open, connecting the first column 62a to the vacuum pump under helium flow. The first column 62a may be also heated during this process.

Valve V1 is then closed, during the heating of the first column 62a. As a result, helium is evacuated from the first column 62a, through the pumping action of the vacuum pump.

Port 1 of valve V2 is finally closed to isolate the first column 62a, while the temperature is restore to it low set point value. The system is then ready for another cycle.

Referring to FIG. 6, in another variant, the discharge gas stream 23 may not originate from a "purified" source, by from a chromatography sample including impurities. The chromatography sample may be the same as the one to be analysed, in which case the chromatography sample is split into the discharge gas stream 23 and sample gas stream 29. Preferably, both sample streams are processed by different chromatography columns 62a and 62b.

In this variant, the PID 20 preferably includes the capability to perform optical monitoring of the discharge zone 22, for example using light collecting assemblies and detection and processing systems such as described above. A sample gas stream containing a carrier gas and impurities is injected into the first column 62a, whose output is connected to the discharge zone inlet 26. The first column 62a separates the impurities in the carrier gas according to its usual operation, outputting a discharge gas stream 23 of carrier gas with impurity peaks separated in time. This discharge gas stream 23 is used to generate a plasma in the discharge zone 22, according to the process described above. Using the optical monitoring system, light from the plasma is detected and analysed to identify gas species in the discharge gas stream 23. The rise and fall of impurity peaks can therefore be monitored in real time. The gas sample to be analysed is injected in the second column 62b, which again separates the impurities according to a usual chromatography process. The output of the second column 62b is connected to the ionisation zone inlet 28.

By alternating the peak elution time of first and second columns 62a and 62b, the PID 20 can work in ionisation mode between the peaks crossing the discharge zone 22, benefitting from the moments where the gas in the discharge zone 22 includes mostly the carrier gas. The timing of this operation mode is schematically illustrated in FIG. 7. When an impurity peak from the first column circulates in the discharge zone 22, there is only carrier gas (no impurities) coming out of the second column 62b and circulating in the ionisation zone 24. The peak from the first column 62a is preferably measured by spectral emission, and vented away.

When an impurity peak from the second column 62b reaches the ionisation zone 22, there is no impurity peak in the opposite side of the detector, i.e. in the discharge zone 22. The discharge can be created in pure carrier gas, maximising photon emission and metastable generation, and minimising discharge quenching effects.

In another variant, the configuration of FIG. 6 may be used in conjunction with proper flow control to synchronize peaks of impurities to be ionised through the ionisation zone with impurity peaks through the discharge zone characterised by optical emissions of energy higher than the ionisation energy of the impurities to be ionised. Such an approach may improve the sensitivity of the ionisation process.

Of course, numerous modifications could be made to the embodiments described above without departing from the scope of the present invention.

The invention claimed is:

1. A discharge-based photo ionisation gas detector for analysing a gas sample, comprising:
  a discharge zone, comprising:
    a plasma chamber configured to receive a flow of a discharge gas therethrough, the plasma chamber having an outlet allowing optical radiation out of the discharge zone;
    a plasma-generating mechanism configured to apply a plasma-generating field across the plasma chamber so as to generate a plasma from said discharge gas; and
    a plasma-localizing mechanism configured to apply a plasma-localizing field across the plasma chamber and positioned such that the plasma-localizing field localizes the plasma within the plasma chamber in alignment with the outlet; and
  an ionisation zone, comprising:
    an ionisation region configured to receive a flow of the gas sample therethrough, the ionisation zone having an inlet allowing optical radiation from the discharge zone into said ionisation region; and
    an ionisation-measuring mechanism configured to measure an ionisation current resulting from a photo ionisation of the gas sample in said ionisation region by said optical radiation.

2. The discharge-based photo ionisation gas detector according to claim 1, wherein the plasma-localizing mechanism comprises:
  a pair of localizing electrodes extending parallelly on opposite sides of the plasma chamber, the plasma-localizing field being an electrical field; and
  a power supply providing a DC or AC driving current to the localizing electrodes.

3. The discharge-based photo ionisation gas detector according to claim 1, wherein the plasma-localizing mechanism comprises a pair of localizing electromagnets extending parallelly on opposite sides of the plasma chamber, the plasma-localizing field being a magnetic field.

4. The discharge-based photo ionisation gas detector according to claim 1, wherein the plasma chamber comprises at least one monitoring window, the discharge-based photo ionisation detector further comprising a light monitoring system configured to detect light transmitted through said at least one monitoring window and analyse said light to identify gas species in the discharge gas.

5. The discharge-based photo ionisation gas detector according to claim 1, wherein the ionisation-measuring mechanism comprises one or more ion-collecting electrodes disposed in the ionisation zone and a current measuring device connected to said one or more ion-collecting electrodes.

6. The discharge-based photo ionisation gas detector according to claim 5, wherein the one or more ion-collecting electrodes define a grid, a plurality of rings, a pair of plates disposed in a parallel configuration, or a pair of spaced apart coaxial cylinders.

7. The discharge-based photo ionisation gas detector according to claim 1, wherein the plasma-generating mechanism comprises:
  a pair of discharge electrodes extending parallelly on opposite sides of the plasma chamber and separated by a discharge gap; and
  an alternating current generator providing an alternating discharge driving signal to the discharge electrodes.

8. The discharge-based photo ionisation gas detector according to claim 7, further comprising a pair of insulating dielectric barriers each extending within the discharge gap along a corresponding one of the discharge electrodes.

9. The discharge-based photo ionisation gas detector according to claim 8, wherein each insulating layer of said pair is defined by a wall of the plasma chamber.

10. The discharge-based photo ionisation gas detector according to claim 9, wherein:
  each discharge electrode of said pair comprises a layer of conductive compound extending along an exterior surface of the corresponding wall of the plasma chamber; and
  the plasma-localizing mechanism comprises a pair of localizing electrodes, each localizing electrode being embedded in a respective one of said discharge electrodes, and a power supply providing a DC or AC driving current to the localizing electrodes.

11. The discharge-based photo ionisation gas detector according to claim 10, wherein the plasma-localizing mechanism further comprises electrically-insulated contact wires connecting the discharge electrodes to the power supply.

12. The discharge-based photo ionisation gas detector according to claim 1, wherein the discharge zone and ionisation zone are disposed end-to-end, the discharge zone and the ionisation zone of the photo ionisation detector respectively comprising a discharge zone inlet and an ionisation zone inlet positioned at opposite extremities of said end-to-end configuration.

13. The discharge-based photo ionisation gas detector according to claim 12, comprising a tubular enclosure, segments of said tubular enclosure defining the discharge zone and ionisation zone.

14. The discharge-based photo ionisation gas detector according to claim 13, wherein the segment of the tubular enclosure defining the ionisation zone has a reduced diameter.

15. The discharge-based photo ionisation gas detector according to claim 13, comprising one or more screen assemblies disposed in the tubular enclosure between the discharge zone and the ionisation zone.

16. The discharge-based photo ionisation gas detector according to claim 15, wherein the screen assemblies are grounded to act as collector electrodes.

17. The discharge-based photo ionisation gas detector according to claim 13, further comprising a flow vent provided through the tubular enclosure between the discharge zone and the ionisation zone.

18. The discharge-based photo ionisation gas detector according to claim 17, further comprising a pressure control system connected to said flow vent.

19. A discharge-based photo ionisation gas detector for analysing a gas sample, comprising:
   a discharge zone configured to receive a flow of a discharge gas therethrough and generate a plasma from said discharge gas, the discharge zone having an outlet allowing optical radiation out of the discharge zone;
   a plasma-localizing mechanism configured to apply a plasma-localizing field across the discharge zone and positioned such that the plasma-localizing field localizes the plasma within the discharge zone in alignment with said outlet; and
   an ionisation zone configured to receive a flow of the gas sample therethrough, the ionisation zone having an inlet allowing the optical radiation from the discharge zone into the ionisation zone to photo ionise the gas sample.

20. The discharge-based photo ionisation gas detector according to claim 19, wherein the plasma-localizing mechanism comprising a pair of localizing electrodes extending parallelly on opposite sides of the discharge zone, the plasma-localizing field being an electrical field.

21. The discharge-based photo ionisation gas detector according to claim 20, wherein the plasma-localizing mechanism further comprises a power supply providing a DC or AC driving current to the localizing electrodes.

22. The discharge-based photo ionisation gas detector according to claim 19, comprising a pair of discharge electrodes extending parallelly on opposite sides of the discharge zone.

23. The discharge-based photo ionisation gas detector according to claim 22, further comprises an alternating current generator providing an alternating discharge driving signal to the discharge electrodes.

24. The discharge-based photo ionisation gas detector according to claim 23, further comprising a pair of insulating dielectric barriers each extending between the discharge electrodes along a corresponding one of the discharge electrodes.

25. The discharge-based photo ionisation gas detector according to claim 22, wherein:
   each discharge electrode of said pair comprises a layer of conductive compound; and
   the plasma-localizing mechanism comprises a pair of localizing electrodes each embedded in a respective one of said discharge electrodes.

26. The discharge-based photo ionisation gas detector according to claim 25, wherein the plasma-localizing mechanism further comprises electrically-insulated contact wires connecting the discharge electrodes to the power supply.

27. A method of analysing a gas sample from a chromatography column, comprising:
   a) providing a discharge-based photo ionisation gas detector having a discharge zone and an ionization zone;
   b) splitting the gas sample into a first sample stream and a second sample stream;
   c) circulating the first sample stream through the discharge zone and applying a plasma-generating field across the discharge zone to generate a plasma from said first sample stream, the plasma emitting optical radiation;
   d) circulating the second sample stream through the ionisation zone and exposing said second sample stream to the optical radiation from the discharge zone, thereby generating an ionisation current by photo ionisation of the second sample stream by said optical radiation; and
   e) measuring said ionisation current.

28. The method according to claim 27, wherein the first and second sample streams obtained from the splitting of step b) have a same volume.

29. The method according to claim 27, further comprising detecting light from the plasma and analysing said light to identify gas species in the first sample stream.

30. The method according to claim 27, wherein the discharge zone and ionisation zone of the photo ionisation detector are disposed in an end-to-end configuration.

31. The method according to claim 30, wherein the discharge-based photo ionisation detector comprises a discharge zone inlet and an ionisation zone inlet positioned at opposite extremities of said end-to-end configuration, the first sample stream being injected in the discharge zone through the discharge zone inlet, and the second sample stream being injected in the ionisation zone through the ionisation zone inlet.

32. The method according to claim 27, further comprising a step of controlling a pressure in the discharge zone and the ionisation zone using a pressure control system positioned between the discharge zone and ionisation zone.

33. The method according to claim 32, wherein the pressure control system maintains the discharge zone and the ionisation zone at atmospheric pressure.

34. The method according to claim 32, wherein the pressure control system maintains the discharge zone and the ionisation zone at a constant pressure below atmospheric pressure.

35. A method of analysing a sample gas stream, comprising:
   a) providing a discharge-based photo ionisation gas detector having a discharge zone and an ionization zone;
   b) circulating a discharge gas stream through the discharge zone, the discharge gas stream comprising a carrier gas and impurity peaks time-separated by a chromatography column;
   c) applying a plasma-generating field across the discharge zone during interstitial moments between said impurity peaks in the discharge gas stream circulating through the discharge zone, thereby generating a plasma from the carrier gas in said discharge gas stream, the plasma emitting optical radiation;
   d) circulating the sample gas stream through the ionisation zone in synchronicity with the generation of the plasma in the discharge zone and exposing said sample gas stream to the optical radiation from the discharge zone, thereby generating an ionisation current by photo ionisation of the sample gas stream by said optical radiation; and
   e) measuring said ionisation current.

36. The method according to claim 35, wherein the carrier gas of the discharge gas stream is helium.

37. The method according to claim 35, wherein the discharge gas stream originates from a purified gas source.

38. The method according to claim 35, further comprising a step of controlling a pressure in the discharge zone and the ionisation zone using a pressure control system positioned between the discharge zone and ionisation zone.

39. The method according to claim 35, wherein the discharge zone and ionisation zone of the photo ionisation detector are disposed in an end-to-end configuration.

40. The method according to claim 39, wherein the discharge-based photo ionisation detector comprises a discharge zone inlet and an ionisation zone inlet positioned at opposite extremities of said end-to-end configuration, the discharge gas stream being injected in the discharge zone through the discharge zone inlet, and the sample gas stream being injected in the ionisation zone through the ionisation zone inlet.

41. The method according to claim 35, wherein the discharge gas stream originates from a chromatography sample.

42. The method according to claim 41, wherein the chromatography sample is split into said discharge gas stream and sample gas stream.

43. The method according to claim 41, wherein the circulating of steps b) and c) comprises synchronizing a passage of said interstitial moments in the discharge gas stream through the discharge zone with a passage of impurity peaks in the sample gas stream through the ionisation zone.

44. The method according to claim 43, further comprising detecting light from the plasma and analysing said light to monitor the passage of said interstitial moments in the discharge gas stream through the discharge zone.

\* \* \* \* \*